| United States Patent [19] | [11] Patent Number: 5,008,329 |
| Abe et al. | [45] Date of Patent: Apr. 16, 1991 |

[54] PROCESS FOR PRODUCING AQUEOUS COPOLYMER DISPERSION FROM A VINYL MONOMER MIXTURE

[75] Inventors: Tadashi Abe; Masahiro Aoki; Tsunenori Takahashi; Takeshi Awata, all of Mie, Japan

[73] Assignee: Mitsubishi Yuka Badische Co., Ltd., Yokkaichi, Japan

[21] Appl. No.: 419,001

[22] Filed: Oct. 10, 1989

Related U.S. Application Data

[63] Continuation of Ser. No. 181,670, Apr. 14, 1988, abandoned.

[30] Foreign Application Priority Data

May 19, 1987 [JP] Japan ............................. 62-120239

[51] Int. Cl.$^5$ ............................................. C08L 93/04
[52] U.S. Cl. ................................. 524/798; 524/736; 524/767; 524/764; 524/831; 524/833
[58] Field of Search ............... 524/736, 767, 764, 829, 524/831, 833, 798

[56] References Cited

U.S. PATENT DOCUMENTS

| | | | |
|---|---|---|---|
| 3,033,790 | 5/1962 | Nelson | 252/51.5 A |
| 4,057,527 | 11/1977 | Columbus | 260/29.6 WB |
| 4,234,467 | 11/1980 | Ryrfors et al. | 260/29.7 H |
| 4,336,172 | 6/1982 | Marquardt et al. | 524/555 |
| 4,365,040 | 12/1982 | Eck et al. | 524/819 |
| 4,455,342 | 6/1984 | Fink et al. | 428/265 |
| 4,540,739 | 9/1985 | Midgley | 524/764 |
| 4,631,312 | 12/1986 | Trevino et al. | 525/221 |
| 4,659,771 | 4/1987 | Craig | 524/700 |
| 4,663,411 | 5/1987 | Reeb et al. | 526/270 |
| 4,681,909 | 7/1987 | Ohta et al. | 524/798 |
| 4,713,412 | 12/1987 | Czerepinski et al. | 524/833 |

FOREIGN PATENT DOCUMENTS 0252526  1/1988  European Pat. Off. .
2130227  5/1984  United Kingdom .

*Primary Examiner*—John Kight, III
*Assistant Examiner*—Dennis R. Daley
*Attorney, Agent, or Firm*—Oblon, Spivak, McClelland, Maier & Neustadt

[57] ABSTRACT

A process for producing an aqueous copolymer dispersion is disclosed, which comprises emulsion polymerizing 100 parts by weight of a vinyl monomer mixture comprising (A) from 60 to 99.8% by weight of an acrylic ester of an aliphatic saturated alcohol having from 4 to 8 carbon atoms, (B) from 0.2 to 10% by weight of a monomer selected from the group consisting of an $\alpha,\beta$-unsaturated carboxylic acid, an $\alpha,\beta$-unsaturated carboxylic acid anhydride, a 2-hydroxyalkyl acrylate, a 2-hydroxyalkyl methacrylate, acrylamide, methacrylamide, methylolacrylamide, and methylolmethacrylamide, and (C) up to 30% by weight of a vinyl monomer other than the monomers (A) and (B) in the presence of from 0.01 to 10 parts by weight of a compound having an allyl hydrogen atom, with a total amount of the monomers (A), (B) and (C) being 100% by weight. The resulting aqueous copolymer dispersion can form a film which exhibits excellent adhesion performance particularly to an adherend having small polarity and gives off no smell.

3 Claims, No Drawings

PROCESS FOR PRODUCING AQUEOUS COPOLYMER DISPERSION FROM A VINYL MONOMER MIXTURE

This application is a continuation of application Ser. No. 07/181,670, filed on April 14, 1988, now abandoned.

FIELD OF THE INVENTION

This invention relates to a process for producing an aqueous copolymer dispersion, and more particularly to a process for producing an aqueous copolymer dispersion which can form a film, and particularly a tacky film, having excellent adhesion to a surface of a material of small polarity, such as polyolefins, etc.

BACKGROUND OF THE INVENTION

It is known that an aqueous dispersion of a copolymer obtained by emulsion polymerization of vinyl monomers can be used for forming tacky films or adhesive films. These films have poor adhesion to a surface of a material having small polarity, such as polyethylene, polypropylene, etc., and the shortage of adhesion has been covered by addition of a tackifier, such as rosin, rosin esters, etc., to the copolymer dispersion after polymerization. However, addition of tackifiers of this type has encountered a problem of serious reduction in cohesive force.

In order to improve adhesion of a film formed by the aforesaid aqueous copolymer dispersion, it has been proposed to conduct the emulsion polymerization in the presence of a thiol type chain transfer agent, e.g., t-dodecylmercaptan, 3-mercaptopropionic acid, etc., to thereby control the molecular weight of the produced copolymer. However, such a thiol compound containing a mercapto group, when used as a chain transfer agent, remains in the resulting copolymer and gives out an offensive smell. Although various proposals for removing the smell have been made, it is practically difficult, as is well known in the art, to completely remove the smell from the copolymer. In addition, it has been reported in Japanese Laid-Open Patent Application No. 228006/86 that a sulfur-containing compound used as chain transfer agent is bonded to the copolymer produced, resulting in reduction of durability of the copolymer.

SUMMARY OF THE INVENTION

Accordingly, one object of this invention is to provide a process for producing an aqueous dispersion of a copolymer of a vinyl monomer capable of forming an adhesive or tacky film having excellent adhesion or tack performance properties, and particularly excellent adhesion performance properties to an adherend having a surface of small polarity, such as polyolefins, etc.

As a result of extensive investigations, it has now been found that the above object can be accomplished by emulsion polymerizing a vinyl monomer mixture containing specific amounts of specific monomers in the presence of a compound having an allyl hydrogen atom.

That is, the present invention relates to a process for producing an aqueous copolymer dispersion which comprises emulsion polymerizing 100 parts by weight of a vinyl monomer mixture comprising (A) from 60 to 99.8% by weight of an acrylic ester of an aliphatic saturated alcohol having from 4 to 8 carbon atoms, (B) from 0.2 to 10% by weight of a monomer selected from the group consisting of an α,β-unsaturated carboxylic acid, an α,β-unsaturated carboxylic acid anhydride, a 2-hydroxyalkyl acrylate, a 2-hydroxyalkyl methacrylate, acrylamide, methacrylamide, methylolacrylamide, and methylolmethacrylamide, and (C) up to 30% by weight of a vinyl monomer other than the monomers (A) and (B) in the presence of from 0.01 to 10 parts by weight of a compound having an allyl hydrogen atom, with a total amount of the monomers (A), (B) and (C) being 100% by weight.

DETAILED DESCRIPTION OF THE INVENTION

The compound having an allyl hydrogen atom which can be used in the present invention includes rosin compounds having an allyl hydrogen atom, terpene compounds having an allyl hydrogen atom, allyl alcohol, cyclohexene, etc., with rosin compounds having an allyl hydrogen atom, terpene compounds having an allyl hydrogen atom, and allyl alcohol being preferred.

Examples of the rosin compounds having an allyl hydrogen atom include gum rosin, tall oil rosin, wood rosin, abietic acid isolated from these rosins, alkali metal salts of abietic acid, esters of abietic acid and a polyhydric alcohol (e.g., ethylene glycol, glycerin, pentaerythritol, trimethylolpropane, etc.), and other various modified rosins or rosin derivatives.

Of these rosin compounds having an allyl hydrogen atom, preferred are abietic acid and derivatives thereof represented by formula (I):

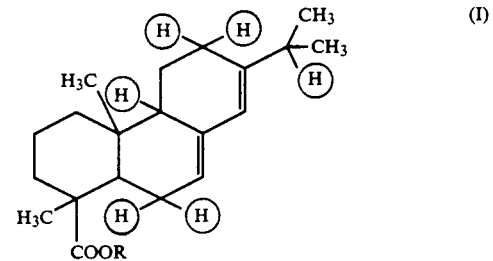

wherein R represents a hydrogen atom, an alkyl group or an alkali metal; and the encircled H represents an allyl hydrogen atom.

Examples of the terpene compounds having an allyl hydrogen atom include terpene resins and terpene phenol resins represented by formula (II):

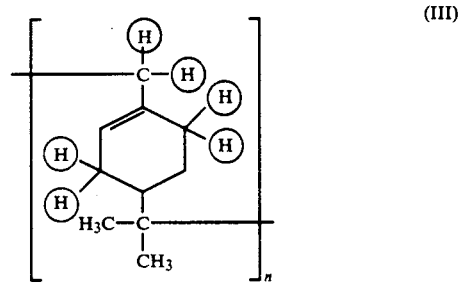

wherein the encircled H represents an allyl hydrogen atom; and n represents a number of the repeated structural units.

The term "allyl hydrogen atom" as used throughout the specification and claims means a hydrogen atom bonded to the position $R^1$, $R^2$ or $R^3$ of an allyl skeleton shown below.

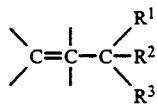

Accordingly, in the compounds represented by formulae (I) and (II), all the encircled hydrogen atoms are allyl hydrogen atoms.

The above-described compound having an allyl hydrogen atom, such as allyl hydrogen-containing rosin compounds, allyl hydrogen-containing terpene compounds, allyl alcohol, cyclohexene, etc., acts as a chain transfer agent in the emulsion polymerization according to the present invention, to thereby effectively reduce the molecular weight of the produced copolymer and improve adhesion or tackiness of the copolymer without causing reduction of cohesive force. The compound having an allyl hydrogen atom is bonded to the copolymer and remains therein but causes by no means an offensive smell as is emitted in the case of using the thiol type chain transfer agents.

The allyl hydrogen-containing compound present in the emulsion polymerization system enters into the resulting copolymer in the form of a segment derived therefrom, and particularly a rosin segment or a terpene segment through chemical bonding. As a result, the resulting copolymer exhibits markedly improved adhesion to an adherend having small polarity, such as polyolefins, etc.

The compound having an allyl hydrogen atom is used in an amount of from 0.01 to 10 parts, and preferably from 0.1 to 3 parts, by weight per 100 parts by weight of the total monomer. If the amount is too small, not only the chain transfer effect would be insufficient but the amount of the compound incorporated into the copolymer produced would be too small to show satisfactory adhesion, and particularly to polyolefins, etc. To the contrary, if the amount of the compound is too large, the chain transfer effect becomes excessively high and, as a result, the produced copolymer is cut off to have an extremely small molecular weight unsuitable for use as adhesive.

The monomer (A) which can be used in the present invention is an acrylic ester of an aliphatic saturated alcohol having 4 to 8 carbon atoms which provides a homopolymer having a glass transition point of $-30°$ C. or lower. Specific examples of the monomer (A) are butyl acrylate, 2-ethylhexyl acrylate, etc. The amount of the monomer ranges from 60 to 99.8% by weight based on the total monomer. If the amount is less than 60% by weight, the film produced from the resulting copolymer dispersion does not have softness.

The monomer (B) is a compound having a functional group -COOH, -OH or -NH$_2$, selected from the group consisting of an $\alpha,\beta$-unsaturated carboxylic acid, an $\alpha,\beta$-unsaturated carboxylic acid anhydride, a 2-hydroxyalkyl acrylate, a 2-hydroxyalkyl methacrylate, acrylamide, methacrylamide, methylolacrylamide, and methylolmethacrylamide. The $\alpha,\beta$-unsaturated carboxylic acid includes acrylic acid, methacrylic acid, itaconic acid, etc. The alkyl moiety in the 2-hydroxyalkyl acrylate or 2-hydroxyalkyl methacrylate contains from 1 to 5 carbon atoms. The monomer (B) is used in an amount ranging from 0.2 to 10%, and preferably from 0.5 to 5%, by weight based on the total monomer. Too large an amount of the monomer (B) deteriorates water resistance of the resulting film, and too small an amount reduces adhesion performance.

The vinyl monomer (C) to be used in the present invention includes a methacrylic ester of an aliphatic saturated alcohol having from 1 to 4 carbon atoms and vinyl monomers other than the monomers (A) and (B). Specific examples of the monomer (C) are methyl methacrylate, ethyl methacrylate, propyl methacrylate, butyl methacrylate, acrylonitrile, vinyl acetate, styrene, methyl acrylate, and the like. In general, when a vinyl monomer which provides a homopolymer having a glass transition point of 60° C. or higher is used in too high a proportion, the resulting copolymer is unsuitable for use as adhesive. Therefore, the amount of the monomer (C) to be used should not exceed 30% by weight based on the total monomer.

According to the process of the present invention, the glass transition point (Tg) of the resulting copolymer can be controlled between $-10°$ C. and $-90°$ C. by appropriately selecting the kinds and proportions of the monomers (A), (B) and (C). Should the aqueous dispersion of the copolymer have Tg falling within the above range, the aqueous dispersion is particularly suitable for forming an adhesive film.

In carrying out the present invention, a monomer mixture comprising the monomers (A), (B) and (C) in the above-described proportions is subjected to emulsion polymerization in the presence of from 0.01 to 10 parts by weight of the compound having an allyl hydrogen atom per 100 parts by weight of the monomer mixture. The emulsion polymerization can be effected by various techniques inclusive of known methods. For example, a polymerization initiator to be used includes inorganic peroxides, e.g., sodium persulfate, potassium persulfate, ammonium persulfate, etc.; organic peroxides, e.g., tertiary hydroperoxide, benzoyl peroxide, di-t-butyl peroxide, etc.; conjugated redox initiators comprising these oxidizing agents and reducing agents; active azo compounds, e.g., azobisisobutyronitrile; and the like. An emulsifying agent to be used may be any of those commonly employed for emulsion polymerization.

The present invention is now illustrated in greater detail with reference to Examples and Comparative Examples, but it should be understood that the present invention is not deemed to be limited thereto. In these Examples, all the parts and percents are by weight unless otherwise specified.

EXAMPLE 1

In a reactor equipped with a temperature controller, an anchor agitator, a reflux condenser, a feed container, a thermometer, and an inlet tube for introducing nitrogen were charged 330 parts of water and 1 part of sodium persulfate.

Feed Material (I) having the following composition was prepared.

| | |
|---|---|
| 2-Ethylhexyl acrylate | 1,300 parts |
| Methyl methacrylate | 130 parts |
| Vinyl acetate | 130 parts |
| Acrylonitrile | 30 parts |
| Acrylic acid | 30 parts |
| Abietic acid | 8 parts |
| Water | 650 parts |
| Aqueous solution (30%) of a sodium salt of a sulfuric acid ester of p- | 106 parts |

-continued nonylphenol having been reacted with
20 molar times of ethylene oxide
(anionic emulsifying agent)

Feed Material (II) (solution of an initiator) was prepared by dissolving 12 parts of sodium persulfate in 160 parts of water.

After the atmosphere of the reactor previously containing an initiator solution was displaced with nitrogen gas, 10% of Feed Material (I) was added thereto, followed by heating to 90° C. Then, 10% of Feed Material (II) was poured into the mixture. Thereafter, the rest of Feed Material (I) and the rest of Feed Material (II) were slowly fed to the reactor simultaneously each at a constant rate over a period of from 3 to 3.5 hours. After completion of the feeding, the temperature was maintained at 90° C. for 1.5 hours to effect emulsion polymerization. The resulting copolymer dispersion was found to have a copolymer concentration of about 57%.

EXAMPLES 2 TO 5

An aqueous copolymer dispersion was prepared in the same manner as described in Example 1, except for altering the monomer composition and the chain transfer agent as shown in Table 1 below.

COMPARATIVE EXAMPLE 1

An aqueous copolymer dispersion was prepared in the same manner as in Example 1, except for excluding abietic acid from the monomer mixture.

COMPARATIVE EXAMPLES 2 AND 3

An aqueous copolymer dispersion was prepared in the same manner as in Example 1, except for replacing the abietic acid as used in Example 1 with t-dodecylmercaptan or 3-mercaptopropionic acid.

COMPARATIVE EXAMPLE 4

To 160 parts of the aqueous copolymer dispersion prepared in Comparative Example 1 was added 8 parts of a 10% toluene solution of abietic acid.

Each of the aqueous copolymer dispersions prepared in the foregoing Examples and Comparative Examples had a copolymer concentration of about 57%.

Each of these dispersions was coated on a polyester film with a wire bar to a wet thickness of $25 \pm 1$ g/m$^2$ and dried at 100° C. for 5 minutes to obtain a test specimen. The adhesive film of the specimen was determined for adhesive strength and cohesive force (holding power) according to the following test methods. In addition, the smell of the dried film was examined. The results obtained are shown in Table 1.

TEST METHODS (1) Adhesive Strength

The specimen (2.5 × 10 cm) was adhered to a polished stainless steel plate (SUS) or a polyethylene sheet, and the adhesive strength was determined by means of an Instron tensile tester. The result was evaluated based on the following rating system.

Excellent . . . 1,800 g/25 mm or more
Good . . . 1,000 to 1,800 g/25 mm
Poor . . . less than 1,000 g/25 mm (2) Cohesive Force (Holding Power)

The specimen (1 × 2 cm) was adhered to a polished stainless steel plate (SUS). A load of 1 kg was applied thereon, and the holding power (the time required for peeling) was measured under the conditions of 20° C. and 65% RH by means of a holding power tester manufactured by Satake Kagaku Kikai Kogyo K.K. The result obtained was rated on the following basis.

Excellent . . . 20 minutes or more
Good . . . 5 to 20 minutes
Poor . . . less than 5 minutes (3) Smell The smell of the dry specimen was examined with a nose and rated on the following basis.

Excellent . . . The specimen has almost no perceptible smell.
Good . . . The specimen has a smell.
Bad . . . The specimen has a strong smell.

TABLE 1

| | Example No. | | | | | Comparative Example No. | | | |
|---|---|---|---|---|---|---|---|---|---|
| | 1 | 2 | 3 | 4 | 5 | 1 | 2 | 3 | 4 |
| Monomer Mixture (%*) | | | | | | | | | |
| [Monomer (A)]: 2-Ethylhexyl acrylate | 80 | 80 | 85 | 85 | 85 | 80 | 80 | 85 | 80 |
| [Monomer (B)]: Acrylic acid | 2 | 2 | 2 | 2 | 1 | 2 | 2 | 2 | 2 |
| [Monomer (C)]: | | | | | | | | | |
| Methyl methacrylate | 8 | 8 | 9 | 10 | 13 | 8 | 8 | 8 | 8 |
| Vinyl acetate | 8 | 8 | 4 | 3 | 1 | 8 | 8 | 4 | 8 |
| Acrylonitrile | 2 | 2 | — | — | — | 2 | 2 | — | 2 |
| Chain Transfer Agent (part**): | | | | | | | | | |
| Abietic acid | 0.5 | — | — | 1.0 | — | — | — | — | 0.5 |
| Sodium abietate | — | 0.3 | — | — | — | — | — | — | — |
| Glycerin abietate | — | — | 0.8 | — | — | — | — | — | — |
| Allyl alcohol | — | — | — | — | 0.05 | — | — | — | — |
| t-Dodecylmercaptan | — | — | — | — | — | — | 0.05 | — | — |
| 3-Mercaptopropionic acid | — | — | — | — | — | — | — | 0.05 | — |
| Film Properties: | | | | | | | | | |
| Adhesive Force to: | | | | | | | | | |
| Stainless steel plate (SUS) | Excellent | Excellent | Excellent | Excellent | Excellent | Poor | Good | Good | Poor |
| Polyethylene sheet | Excellent | Good | Good | Excellent | Excellent | Poor | Good | Good | Poor |
| Cohesive Force (Holding Power) | Good | Good | Good | Good | Good | Excellent | Good | Good | Poor |
| Smell | Excellent | Excellent | Excellent | Excellent | Excellent | Excellent | Bad | Bad | Bad |

TABLE 1-continued

| | Example No. | | | | | Comparative Example No. | | | |
|---|---|---|---|---|---|---|---|---|---|
| | 1 | 2 | 3 | 4 | 5 | 1 | 2 | 3 | 4 |
| | lent | lent | lent | lent | lent | lent | | | (toluene smell) |

Note:
*% by weight based on the total monomer
**part by weight per 100 parts by weight of the total monomer The aqueous copolymer dispersion prepared by the process of the present invention can form a film excellent in adhesive or tack performance properties. In particular, the film is excellent in adhesion to an adherend having small polarity. Further, the film gives off no smell at all as is exuded from a film of an aqueous copolymer dispersion prepared by using the conventional thiol type chain transfer agent.

While the invention has been described in detail and with reference to specific embodiments thereof, it will be apparent to one skilled in the art that various changes and modifications can be made therein without departing from the spirit and scope thereof.

What is claimed is:

1. A process for producing an aqueous copolymer dispersion, wherein the polymer has a glass transition point ranging from $-10°$ C. to $-90°$ C., which consists of:

emulsion polymerizing, in an aqueous medium containing a polymerization initiator, 100 parts by weight of a vinyl monomer mixture consisting of (A) from 60% to 99.8% by weight of 2-ethylhexyl acrylate, (B) from 0.2 to 10% by weight of an $\alpha,\beta$-unsaturated carboxylic acid, and (C) up to 30% by weight of a vinyl monomer other than monomers (A) and (B) in the presence of an emulsifying agent and from 0.01 to 10 parts by weight of a compound having an allyl hydrogen atom selected from the group consisting of abietic acid and derivatives thereof having the formula:

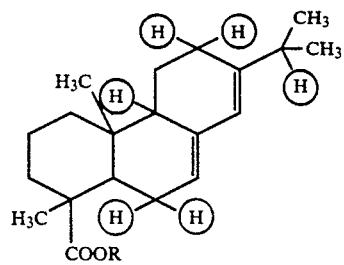

wherein R is hydrogen or alkyl and the encircled H groups represent allyl hydrogen atoms, and allyl alcohol.

2. The process as claimed in claim 1, wherein said compound having an allyl hydrogen atom is present in an amount ranging from 0.1 to 3 parts by weight per 100 parts by weight of the total monomers.

3. The process as claimed in claim 1, wherein said component (B) is present in an amount ranging from 0.5 to 5% by weight based on the total monomer content.

* * * * *